United States Patent
Saito et al.

(10) Patent No.: US 11,190,695 B2
(45) Date of Patent: Nov. 30, 2021

(54) IMAGING DEVICE, CONTROL METHOD THEREOF, AND IMAGING SYSTEM CORRECTING BLUR BASED ON IMAGE CIRCLE INFORMATION

(71) Applicant: CANON KABUSHIKI KAISHA, Tokyo (JP)

(72) Inventors: Junichi Saito, Kanagawa (JP); Masafumi Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/188,196

(22) Filed: Mar. 1, 2021

(65) Prior Publication Data

US 2021/0281760 A1    Sep. 9, 2021

(30) Foreign Application Priority Data

Mar. 3, 2020 (JP) .............................. JP2020-035762

(51) Int. Cl.
*H04N 5/225* (2006.01)
*H04N 5/232* (2006.01)
*G03B 17/14* (2021.01)

(52) U.S. Cl.
CPC ......... *H04N 5/23287* (2013.01); *G03B 17/14* (2013.01); *H04N 5/2254* (2013.01); *H04N 5/23296* (2013.01)

(58) Field of Classification Search
CPC ...................................................... G03B 17/14
See application file for complete search history.

(56) References Cited

U.S. PATENT DOCUMENTS

| 9,918,004 | B2* | 3/2018 | Inata | H04N 5/2351 |
| 2019/0141246 | A1* | 5/2019 | Sugita | G03B 13/22 |
| 2020/0358942 | A1* | 11/2020 | Kimura | G03B 13/36 |
| 2020/0404183 | A1* | 12/2020 | Kimura | H04N 5/23287 |

FOREIGN PATENT DOCUMENTS

JP    4567313 B2    10/2010

\* cited by examiner

*Primary Examiner* — Gary C Vieaux
(74) *Attorney, Agent, or Firm* — Cowan, Liebowitz & Latman, P.C.

(57) ABSTRACT

A lens device is able to be installed in an imaging device via a mount part. The imaging device comprises a correction unit performing image blur correction through driving of an imaging element and a control unit which controls driving of the correction unit. The control unit determines a range of an amount of drive control of the correction unit on the basis of a difference between a second length and a positioning accuracy when the imaging element is positioned at the center of the mount part using the correction unit. The second length is obtained by subtracting a diagonal length associated with an imaging range of the imaging element from a first length corresponding to a closest distance to the center of the mount part from a circumference of an imaging circle when viewed from an optical axis direction of an imaging optical system included in the lens device.

10 Claims, 4 Drawing Sheets

IMAGING DEVICE, CONTROL METHOD THEREOF, AND IMAGING SYSTEM CORRECTING BLUR BASED ON IMAGE CIRCLE INFORMATION

BACKGROUND OF THE INVENTION

Field of the Invention

The present invention relates to a technique for performing image blur correction by controlling the driving of an imaging element in an imaging device in which a lens device can be installed in a main body part.

Description of the Related Art

Imaging devices having a function for correcting image blurring of an image due to hand shake and the like perform image blur correction processing using a detection signal from a shake detection unit such as a gyro sensor or motion information detected from temporally consecutive captured images. Japanese Patent No. 4567313 discloses a technique for performing image blur correction by moving a part of an imaging element or an imaging optical system in a plane perpendicular to an optical axis of the imaging optical system. In the control of image blur correction, information required for image blur correction is transmitted and received through communication between an interchangeable lens and a camera main body part and processing for determining a ratio at which parts of the imaging element and the imaging optical system are driven is performed.

Incidentally, a user may install and use an interchangeable lens which has been previously manufactured, an interchangeable lens which has been optimized for another system, or the like in a main body part of an imaging device in some cases. In this case, if a control unit in the main body part of the imaging device cannot transmit and receive information required for image blur correction, the range of an amount of drive control of the imaging element is likely to be unable to be determined due to insufficient information. Thus, image blur correction can only be performed by driving a part (a correction lens) of the imaging optical system in the interchangeable lens. Furthermore, there is a problem when image blur correction is performed by driving an image blur correction member included in the interchangeable lens and the image blur correction member included in the main body part of the imaging device without handling such a situation of insufficient information. In this case, it may not be possible to secure the brightness for a peripheral portion of a captured image due to an influence of an edge portion of an image circle with an insufficient amount of light in some cases.

SUMMARY OF THE INVENTION

The present invention provides an imaging device in which a lens device can be installed in a main body part and image blur correction can be performed while deterioration of image quality is minimized.

A device in an embodiment of the present invention is an imaging device in which a lens device is able to be installed via a mount part, and including: at least one processor and memory holding a program which makes the processor function as: a correction unit configured to perform image blur correction through driving of an imaging element; and a control unit configured to control driving of the correction unit based on detection information of a detection unit configured to detect shaking of the lens device or the imaging device. The control unit determines a range of an amount of drive control of the correction unit on the basis of a difference between a second length and a positioning accuracy when the imaging element is positioned at a center of the mount part using the correction unit. The second length obtained by subtracting a diagonal length associated with an imaging range of the imaging element from a first length corresponding to a closest distance to the center of the mount part from a circumference of an imaging circle when viewed from an optical axis direction of an imaging optical system included in the lens device.

Further features of the present invention will become apparent from the following description of exemplary embodiments with reference to the attached drawings.

DESCRIPTION OF THE EMBODIMENTS

An embodiment of the present invention will be described in detail below with reference to the drawings. As an example of an imaging system, an interchangeable lens type camera system in which a lens device can be installed and used in a main body part of an imaging device is illustrated. In the imaging device having an image blur correction function, processing for calculating and determining an image blur correction stroke range (a drive control range of an image blur correction means) according to a combination of the lens device and the main body part will be described.

Figure 1A:
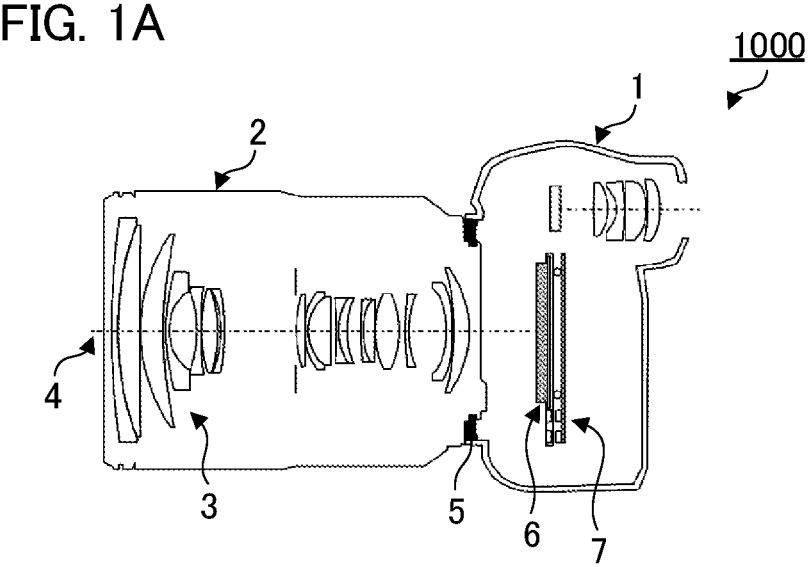
FIGS. 1A and 1B are diagrams illustrating an example of a configuration of an imaging device according to an embodiment.
Figure 1B:
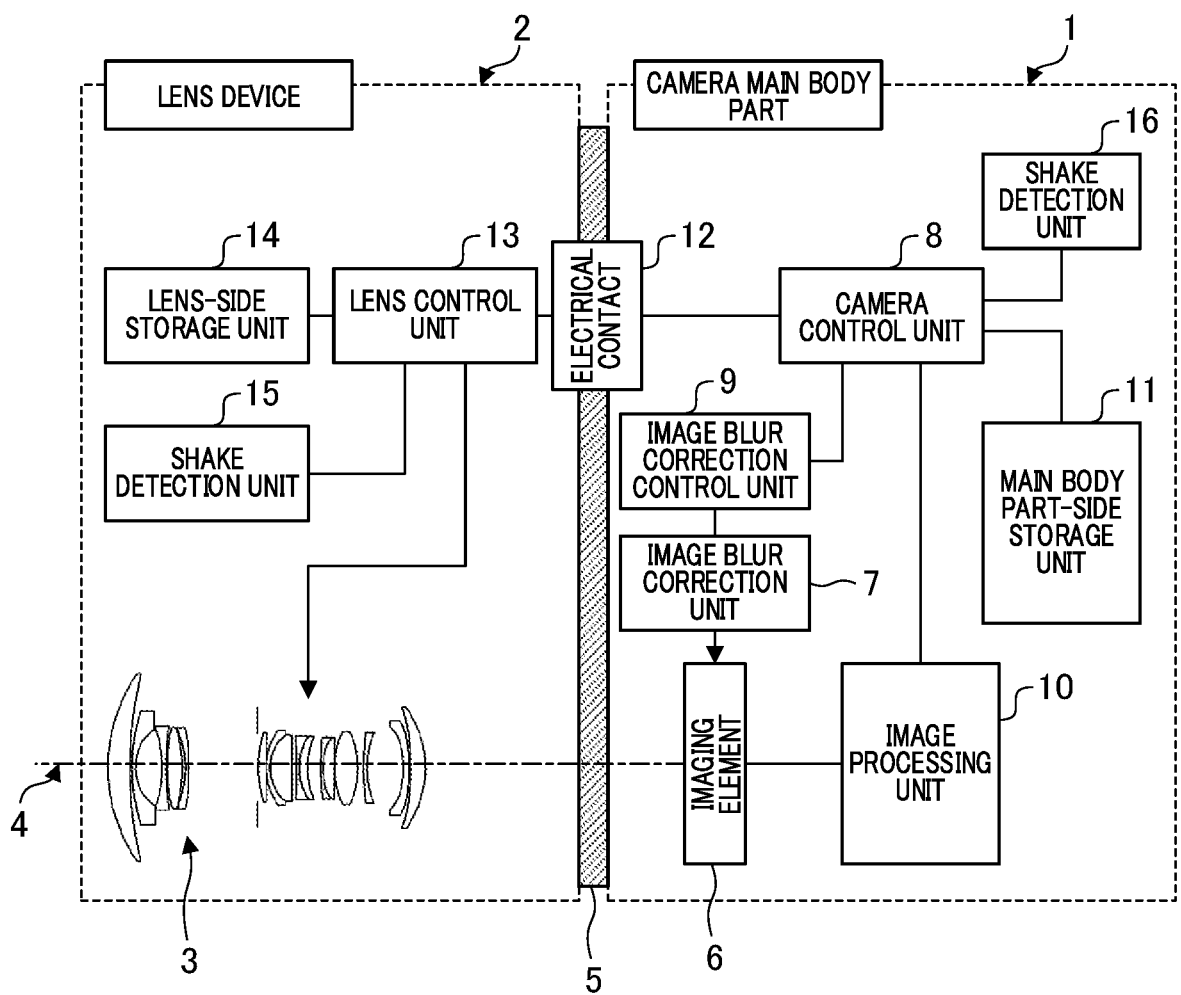

FIGS. 1A and 1B are schematic diagrams illustrating an example of a configuration of the imaging system in the embodiment. FIG. 1A is a central cross-sectional view of an imaging system 1000. FIG. 1B is a block diagram illustrating an electrical configuration of the imaging system 1000.

In the imaging system 1000, a lens device 2 can be installed in a main body part (the imaging device) 1. The lens device 2 is an interchangeable lens installed in the main body part 1 via a mount part 5. The interchangeable lens is a lens unit installed and used in the main body part 1 by a user in accordance with the purpose of photographing. The mount part 5 is a connection member such as a mount block configured to connect the lens device 2 to the main body part 1. The imaging system 1000 is a so-called interchangeable lens type single-lens camera and has a configuration in which various interchangeable lenses can be attached and detached via the ring-shaped mount part 5. FIG. 1A illustrates an optical axis 4 of an imaging optical system 3 included in the lens device 2.

The main body part 1 includes an imaging element 6 and an image blur correction unit 7. The image blur correction unit 7 performs image blur correction on a photographed image by moving or rotating the imaging element 6 in a plane orthogonal to the optical axis 4. Constituent elements associated with the control performed by the imaging system 1000 will be described with reference to FIG. 1B.

The main body part 1 includes the imaging element 6, the image blur correction unit 7, a camera control unit 8, an image blur correction control unit 9, an image processing unit 10, a storage unit 11, and a shake detection unit 16. Furthermore, the lens device 2 includes the imaging optical system 3, a lens control unit 13, a storage unit 14, and a shake detection unit 15. In a state in which the lens device 2 is installed in the main body part 1, the imaging optical system 3 forms an image of light from a subject and the imaging element 6 performs photoelectric conversion on a light image of the subject. Light rays at a photographing angle of view centering on the optical axis 4 of the imaging optical system 3 are transmitted through each optical member of the imaging optical system 3 and form an image on the imaging element 6 as a subject image.

A photoelectric conversion unit (not shown) included in the imaging element 6 performs photoelectric conversion on the subject image and outputs an electrical signal to the image processing unit 10. The image processing unit 10 performs development processing, gamma processing, and the like on an image signal output by the imaging element 6 and generates image data in a prescribed image file format. The image data is stored in a non-volatile memory (not shown) using the camera control unit 8. The camera control unit 8 includes, for example, a CPU (central processing unit) and controls each constituent unit of the imaging system 1000 by executing a prescribed program.

The imaging element 6 in the main body part 1 can be moved in a plane perpendicular to the optical axis 4 using the image blur correction unit 7. The camera control unit 8 controls the image blur correction unit 7 via the image blur correction control unit 9 on the basis of a detection signal from a shake detection sensor or motion information (a motion vector or the like) of an image acquired from an image signal by the imaging element 6. For example, there are the following embodiments in which detection information is acquired:

(1) A form in which the main body part 1 includes the shake detection unit 16 and the lens device 2 includes the shake detection unit 15;
(2) A form in which one of the main body part 1 and the lens device 2 includes the shake detection unit;
(3) A form in which the image processing unit 10 calculates motion information of an image from an output signal of the imaging element 6; and
(4) A form in which (1) or (2) and (3) are combined.

The shake detection units 15 and 16 include shake detection sensors and detect hand-shaking applied to the lens device 2 and the main body part 1. The shake detection sensors are angular velocity sensors, acceleration sensors, or the like. When only the form (3) described above is applied, the shake detection sensors are not required. Thus, it is possible to simplify the configuration. In either form, when the image blur correction control unit 9 controls the driving of the image blur correction unit 7, it is possible to reduce an influence of unnecessary vibration caused due to a photographer's hand shake or the like on a captured image.

The image blur correction control unit 9 controls the imaging element 6 such that it is moved via the image blur correction unit 7. At that time, the imaging element 6 can be positioned at a center of the mount part 5 with a prescribed positioning accuracy. Although information regarding the positioning accuracy of the imaging element 6 in the image blur correction is handled as a design value indicating the process capability at the time of producing the imaging device in the embodiment, the present invention is not limited thereto and an individual value at the time of performing manufacturing for each camera may be used. The individual value is a value unique to each device. It is assumed that the design value or the individual value at the time of producing is held in the storage unit 11 of the main body part 1.

The camera control unit 8 can communicate with the lens control unit 13 in the lens device 2 via an electrical contact 12. The electrical contact 12 is disposed in the mount part 5 and the camera control unit 8 and the lens control unit 13 transmit and receive electric power and electric signals in accordance with a predetermined protocol. In the imaging system 1000 in FIG. 1A, the lens control unit 13 controls the driving of the optical member or the like via various control units according to a command of the camera control unit 8. For example, the lens control unit 13 may control the driving of a focus lens of the imaging optical system via a focus adjustment control unit (not shown) when receiving a control command signal according to focus state detection information of the imaging optical system obtained using the image processing unit 10 from the camera control unit 8. A focus adjustment operation in which the device is focused on the subject is performed by moving the focus lens. Furthermore, the lens control unit 13 performs light amount adjustment control using an aperture and image blur correction control using an image blur correction lens. In the optical image blur correction, for example, control is performed so that the image blur correction lens (a shift lens or the like) constituting the imaging optical system 3 is moved in a plane orthogonal to the optical axis 4.

The storage unit 11 of the main body part 1 is constituted of a ROM (read only memory) which has information required for control performed by the camera control unit 8 stored therein in advance or a RAM (random access memory) which can handle the selection of a photographer. For example, the storage unit 11 stores information regarding an interchangeable lens other than the lens device 2 which has existed before the camera system illustrated in this example has been produced. The camera control unit 8 can optimize an image processing method and focus detection for each interchangeable lens using the information stored in the storage unit 11.

The storage unit 14 of the lens device 2 has the same configuration as the storage unit 11 and stores, for example, optical information or the like required for focus adjustment control performed by the camera control unit 8. The lens device 2 is an interchangeable lens corresponding to the latest protocol determined in the camera system illustrated in this example. For this reason, the storage unit 14 stores in advance information indicating a location in which the optical axis 4 or a center position of the total luminous flux is located with respect to the mount part 5. That is to say, each of these pieces of information is stored in the storage unit 14 as optical axis offset information and maximum offset information at a center of an image circle. Furthermore, the storage unit 14 stores information concerning a diameter of the image circle which the imaging optical system 3 has on the imaging surface.

Here, it is assumed that an interchangeable lens other than the lens device 2 is installed in the main body part 1. This interchangeable lens is an interchangeable lens which does not correspond to the protocol in the camera system illustrated in this example. In this case, in order to prevent a situation in which the camera control unit 8 cannot refer to the offset information and the image circle diameter information described above, the storage unit 11 of the main body part 1 stores information corresponding to the interchangeable lens for each interchangeable lens. The information held by the storage units 11 and 14 is utilized for the purpose of optimizing the image blur correction in the camera system illustrated in this example. The details of the control will be described later.

The imaging element 6 is performed a drive control (moved or rotated) by the image blur correction unit 7 with the center of the mount part 5 as a center. In the drive control, the camera control unit 8 can change a center of the image circle of the lens device 2 to a reference position on the basis of maximum offset information regarding the center of the image circle which is a notification from the lens control unit 13. That is to say, when the center of the imaging element 6 is aligned with the center of the image circle on the basis of the maximum offset information regarding the center of the image circle, the image quality can be improved. On the other hand, when the process in which the center of the imaging element 6 is aligned with the center of the image circle is not performed, the balance between amounts of light at the four corners of the photographed image is likely to be lost due to a decrease in amount of peripheral light in some cases. In the embodiment, when the process in which the center of the imaging element 6 is aligned with the center of the image circle is performed, the balance between amounts of light is ensured and deterioration of image quality can be minimized.

Figure 2A:
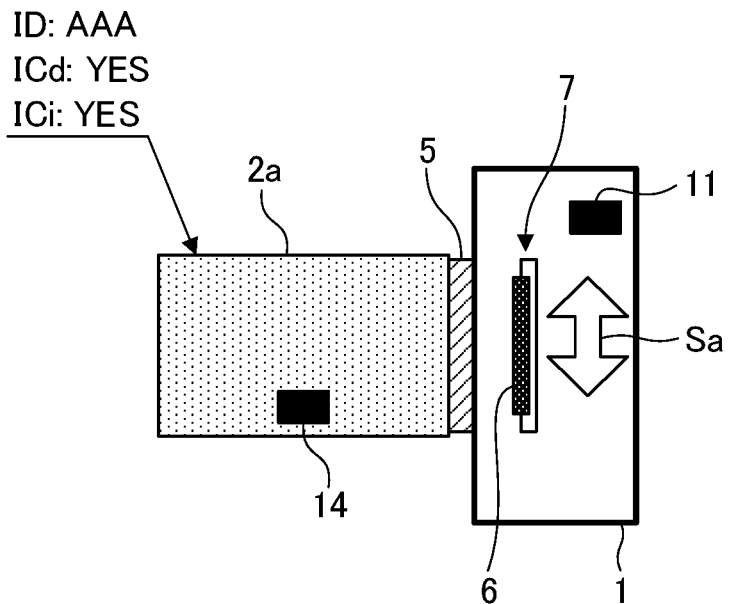
FIGS. 2A and 2B are diagrams for explaining a combination of a lens device and a main body part in the embodiment.
Figure 2B:
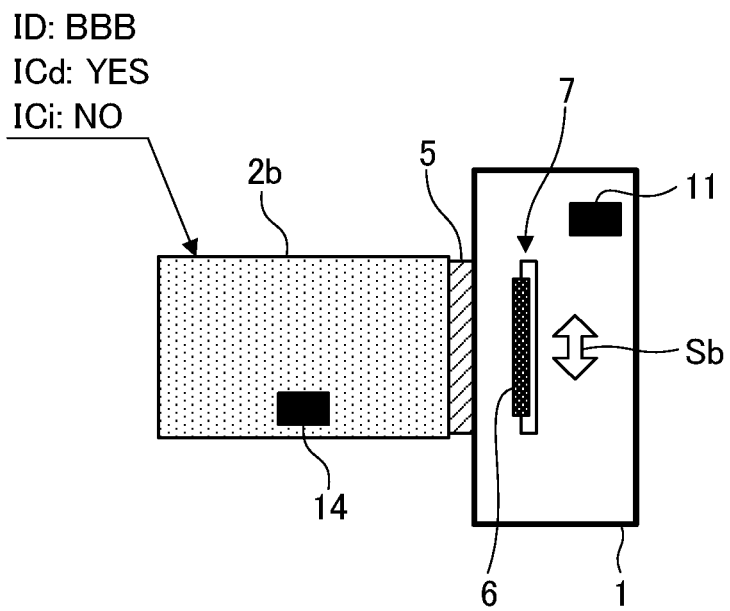

The optimization of the image blur correction control in the camera system will be described below. FIGS. 2A and 2B are conceptual diagrams illustrating the camera system. FIG. 2A illustrates a state in which a lens device 2a is attached to the main body part 1 and FIG. 2B illustrates a state in which a lens device 2b is attached to the main body part 1. The lens device 2a and the lens device 2b are interchangeable lenses having different characteristics and are distinguished using alphabetical letters.

The lens device 2a illustrated in FIG. 2A is installed in the main body part 1 via the mount part 5. The lens device 2a includes the storage unit 14 and the storage unit 14 holds the maximum offset information at the center of the image circle, the image circle diameter information, and an identification number for notifying the main body part 1 that this lens is the lens device 2a. An identification number ID of the lens device 2a is written as "AAA". As the maximum offset information at the center of the image circle, an amount of error at the time of producing (individual offset information unique to the device) is written as "ICi". Furthermore, as the image circle diameter information, a design nominal value (a design image circle diameter) is written as "ICd". "YES" shown in FIG. 2A means that the storage unit 14 is storing data which is ICi or ICd. Each piece of data which is ICi and ICd stored in the storage unit 14 of the lens device 2a is acquired using the camera control unit 8 and the image blur correction control unit 9 of the main body part 1 via the lens control unit 13. The image blur correction control unit 9 of the main body part 1 uses the acquired data to control the driving of the imaging element 6 within a stroke range appropriate for the lens device 2a using a position in which the individual offset information "ICi" is cancelled out as a reference position. A method for determining the stroke range will be described later with reference to FIG. 3A.

The lens device 2b illustrated in FIG. 2B is installed in the main body part 1 via the mount part 5. The lens device 2b includes the storage unit 14 and the storage unit 14 holds the image circle diameter information and the identification number. An identification number ID used for notifying the main body part 1 that the device is the lens device 2b is written as "BBB". "YES" shown in FIG. 2B means that the storage unit 14 dosen't stores data which is ICd and "NO" means that the storage unit 14 stores data which is ICi.

The lens device 2b is an interchangeable lens produced for a camera system different from the lens device 2a (hereinafter referred to as a "system B") through optimization. On the other hand, the lens device 2a is an interchangeable lens conforming to the camera system of FIGS. 1A and 1B (hereinafter referred to as a "system A"). Therefore, when the lens device 2b is installed and used in the main body part 1, the main body part 1 cannot perform processing which can be performed in the lens device 2a conforming to the system A. For example, it is impossible to change the reference position of the imaging element 6 according to the individual offset information ICi and to calculate a minimum image circle diameter which will be described later. However, even if the lens is an interchangeable lens conforming to the system B, at a design stage, a minimum image circle margin which will be described later can be secured in some cases. In this case, image blur correction can be performed with the minimum image circle margin and an image blur correction stroke based on an effective imaging range of the imaging element 6 and the positioning accuracy of the image blur correction unit 7. A process for calculating the image blur correction stroke (an amount of drive control) in the embodiment will be described with reference to FIGS. 3A and 3B.

Figure 3A:
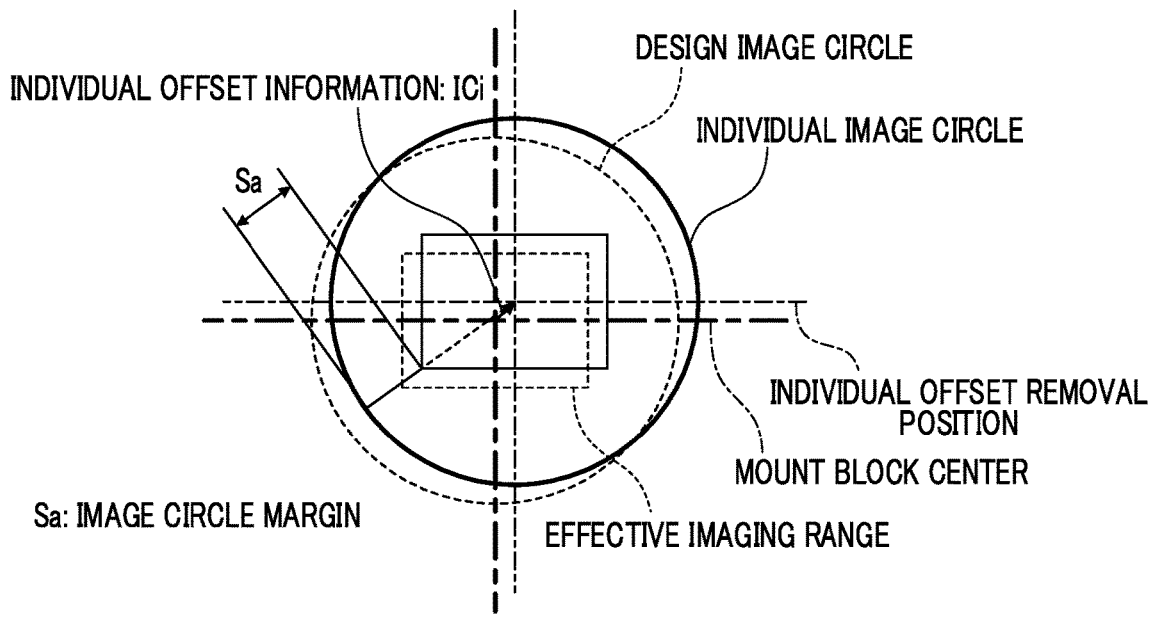
FIGS. 3A and 3B are schematic diagrams for explaining control of image blur correction in the embodiment.

FIG. 3A is a conceptual diagram in a case in which the lens device 2a is installed in the main body part 1 and illustrates a positional relationship of the imaging optical system 3 when viewed from an optical axis direction. The circle indicated by the thick solid line in FIG. 3A represents a position of an individual image circle. The circle indicated by the broken line represents a position of a design image circle. That is to say, an individual image circle (refer to a thick solid line) is represented as a circle in which a circle representing the design image circle is shifted by the individual offset information ICi (refer to the arrow). A rectangular shape indicated by the broken line in FIG. 3A represents the effective imaging range of the imaging element 6 positioned with the positioning accuracy of the image blur correction unit 7 with the center of the mount part 5 as a center. The center of the mount part 5 corresponds to the intersection of the cross-shaped lines indicated by the alternate long and short dash line (a thick line). The positioning accuracy is the accuracy of the imaging optical system when viewed from the optical axis direction when the imaging element 6 is positioned at the center of the mount part 5 using the image blur correction unit 7. The positioning accuracy is stored in the storage unit 11 as data or is used as a predetermined accuracy as a limit amount of a production error defined using the camera system. Information regarding the effective imaging range of the imaging element 6 is held by the camera control unit 8 or the storage unit 11. The rectangular shape indicated by the solid line in FIG. 3A represents the effective imaging range of the imaging element 6 positioned at a position in which the individual offset information ICi (refer to the arrow) is cancelled. An individual offset removal position is a position of the intersection of the cross-shaped lines indicated by the alternate long and short dash line (the thin line).

In FIG. 3A, the image blur correction stroke is represented by an image circle margin Sa. This Sa is a quantity when expressed on one side of a drive signal amplitude of image blur correction (in the range over the entire amplitude of the drive signal, it is twice that amount). A length obtained by subtracting a diagonal radius (a half of a diagonal length) with the rectangular shape indicating the effective imaging range of the imaging element 6 and the positioning accuracy of the image blur correction unit 7 from a half (a radius) of the design image circle diameter ICd is the image circle margin Sa. Alternatively, a length obtained by subtracting a diagonal radius with the rectangular shape indicating the effective imaging range of the imaging element 6 on which the positioning based on the individual offset information ICi is performed and the positioning accuracy of the image blur correction unit 7 from the individual image circle radius is the image circle margin Sa.

The lens device 2a is an interchangeable lens which conforms to the system A and stores information in which predetermined protocols are all satisfied. The image circle margin Sa corresponding to the lens device 2a is designed to have a value sufficient for a focal length of the lens device 2a, an amount of hand shake to be assumed, and the like.

Figure 3B:
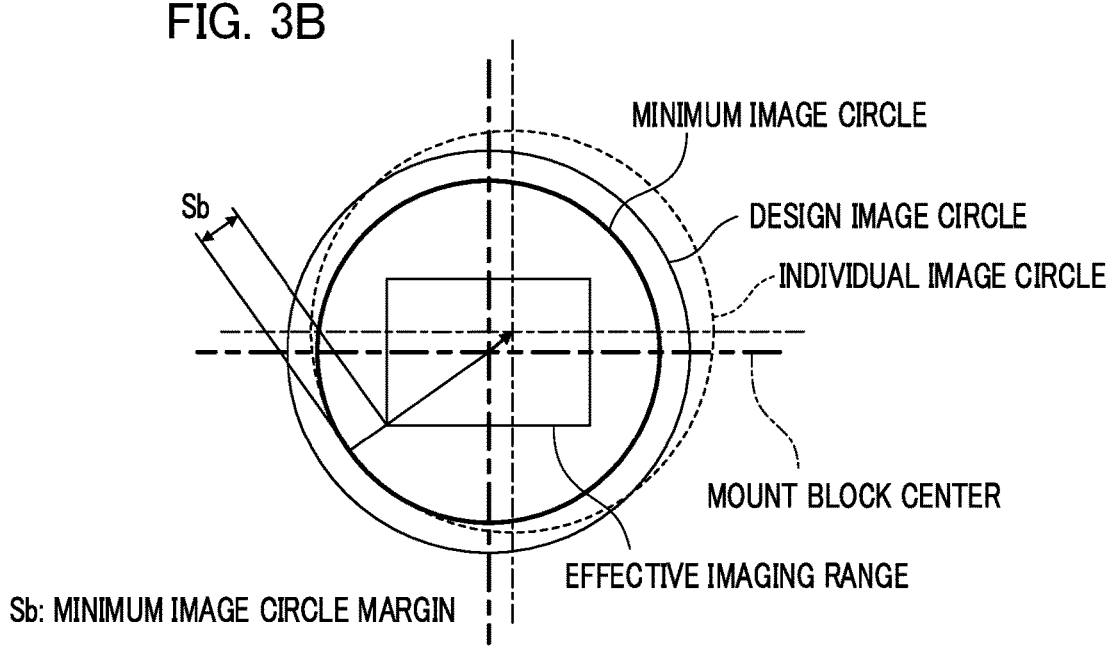

FIG. 3B is a conceptual diagram for explaining the calculation of the minimum image circle and the minimum image circle margin and shows a positional relationship of the imaging optical system when viewed from the optical axis direction. In FIG. 3B, the minimum image circle is represented by a thick solid line circle and the design image circle is represented by a thin solid line circle. The individual image circle is represented by a broken line circle. The minimum image circle diameter is calculated in the camera control unit 8. The radius of the minimum image circle (the thick solid line circle) is represented by a closest distance to the center of the mount part 5 from the circle (the broken line circle) corresponding to the design image circle (the thin solid line) shifted by the individual offset information ICi (refer to the arrow). That is to say, the minimum image circle diameter is smaller than the design image circle diameter. The center of the mount part 5 corresponds to the intersection of the cross-shaped lines indicated by the alternate long and short dash line (the thick line). The rectangular shape indicated by the solid line in FIG. 3B represents the effective imaging range of the imaging element 6. It is desirable to perform the drive control of the imaging element 6 without the rectangular shape representing the effective imaging range extending beyond the circle representing the minimum image circle.

In FIG. 3B, the image blur correction stroke is represented by the minimum image circle margin Sb. This Sb is a quantity when expressed on one side of the drive signal amplitude of image blur correction (in the range over the entire amplitude of the drive signal, it is twice that amount). To be more specific, the image blur correction stroke of the lens device 2b is a difference amount obtained by subtracting the diagonal radius (a half of the diagonal length) of the rectangular shape indicating the effective imaging range of the imaging element 6 and the positioning accuracy of the image blur correction unit 7 from the minimum image circle radius. With regard to this image blur correction stroke, for the lens device 2b, a sufficient image blur correction effect is also likely to be unable to necessarily be expected with respect to a relationship or the like between the hand shake and the focal length of the imaging device. However, when the image blur correction is performed within the range of this image blur correction stroke, it is possible to exert the image blur correction effect while minimizing extreme deterioration due to the dimming of light at the four corners of the image. Furthermore, when the lens device 2b does not include the image blur correction lens, the image blur correction effect is achieved through the control of the driving of the imaging element 6 in the main body part 1.

Figure 4:
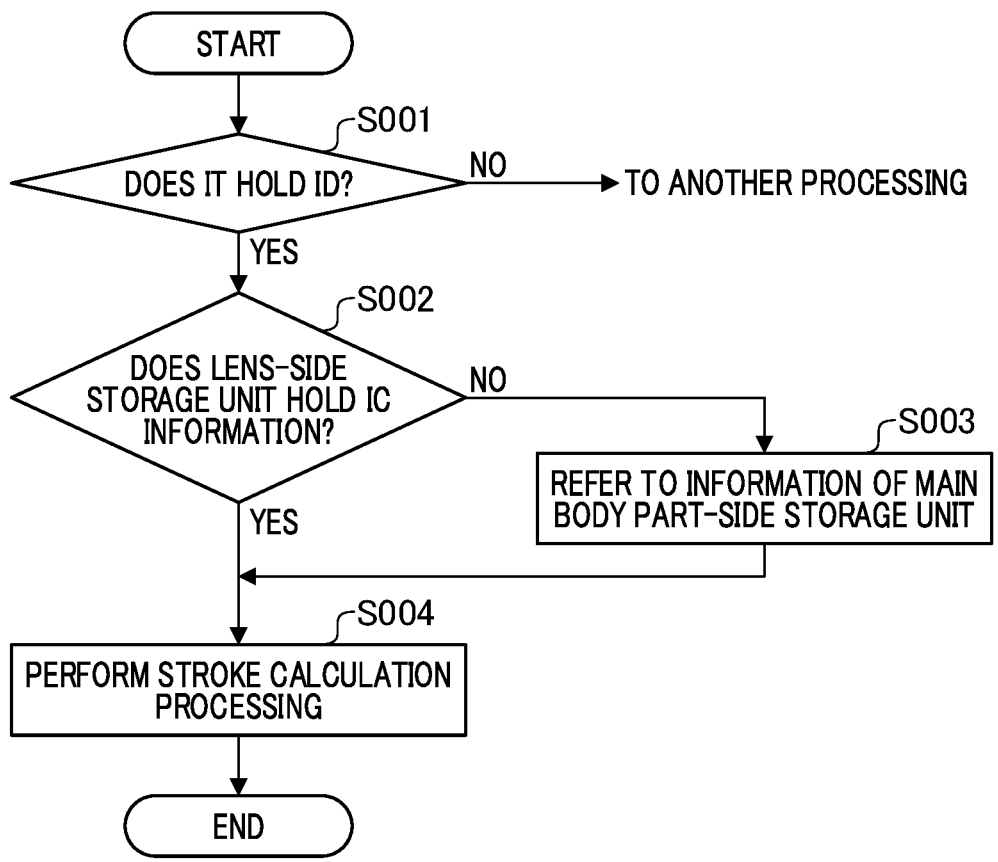
FIG. 4 is a flowchart for explaining the control of image blur correction in the embodiment.

FIG. 4 is a flowchart for explaining processing for determining an image blur correction stroke of the image blur correction unit 7 in this embodiment. The processing which will be illustrated below starts when the lens device is installed in the main body part 1 or starts when electricity is applied to the imaging system 1000.

In S001 of FIG. 4, the camera control unit 8 performs processing of identifying the lens device installed in the main body part 1. For example, a storage unit of the lens device 2a stores "AAA" as an identification number ID and a storage unit of the lens device 2b stores "BBB" as an identification number ID. The camera control unit 8 determines whether the storage unit of the lens device holds the identification number for identifying the lens device. When it is determined that the storage unit of the lens device does not hold the identification number, it is unclear whether the lens device can secure the minimum image circle margin. For this reason, the process transitions to another process. The other process is, for example, a process of determining the image blur correction stroke without performing a determination concerning whether the camera control unit 8 can secure the minimum image circle margin. The camera control unit 8 performs a process in which the image blur correction stroke is allocated within a range in which a dimming level of light (a decrease in amount of peripheral light) at the four corners of the image is not a threshold value or more with reference to focal length information and the like designated by a photographer.

In S002, the camera control unit 8 performs a determination concerning the information stored in the storage unit 14 of the lens device installed in the main body part 1. When it is determined that the storage unit 14 stores the information associated with the image circle such as the design image circle diameter ICd and the individual offset information ICi, the process proceeds to the process of S004. Furthermore, when it is determined that the storage unit 14 does not store the information associated with the image circle, the process proceeds to the process of S003.

In S003, the camera control unit 8 refers to the information stored in the storage unit 11, associated with the image circle relating to the interchangeable lens conforming to another system (for example, the system B). After S002 or S003, the process proceeds to the process of S004 and the camera control unit 8 calculates and determines the image blur correction stroke from the image circle margin using the method described with reference to FIGS. 3A and 3B. For example, when the lens device 2a illustrated in FIG. 2A is installed, an image blur correction stroke range (refer to an arrow Sa) calculated from a value which is twice the image circle margin Sa is determined. Furthermore, when the lens device 2b illustrated in FIG. 2B is installed, an image blur correction stroke range (refer to an arrow Sb) calculated from a value which is twice the minimum image circle margin Sb is determined. In this case, the image blur correction stroke range when the lens device 2b is installed is narrower than the image blur correction stroke range when the lens device 2a is installed.

After S004, a series of processes is completed. After that, the image blur correction control unit 9 of the main body part 1 performs the drive control of the imaging element 6 within the image blur correction stroke range determined in S004 to acquire the image which has been subjected to the image blur correction.

The storage unit 11 or the storage unit 14 in the embodiment stores image circle diameter information, maximum offset information at the center of the image circle, or offset information of the optical axis of the imaging optical system for each lens device. For example, with regard to the image circle diameter information and the maximum offset information at the center of the image circle, the storage unit stores a plurality of pieces of data corresponding to a focus state, a zoom state, or an aperture value of the imaging optical system. The focus state is a state corresponding to a position and focus detection information of the focus lens 5 and the zoom state is a state corresponding to a position of a zoom lens, a photographing magnification, a photographing angle of view, and the like. The camera control unit 8 can acquire information required for processing from the storage unit 11 or the storage unit 14 in accordance with a photographing situation.

Alternatively, the storage unit 11 or the storage unit 14 stores the image circle diameter information and the maximum offset information at the center of the image circle as data which does not depend on the focus state, the zoom state, or the aperture value of the imaging optical system. In this case, the camera control unit 8 can acquire a single value of each state from the storage unit 11 or the storage unit 14 regardless of the focus state, the zoom state, and the aperture value of the imaging optical system, the processing can be simplified.

When the insufficient information required for image blur correction is stored only with the stored information of the storage unit included in the lens device, the camera control unit 8 searches the storage unit 11 for the information corresponding to the identification information of the lens device and uses the found information. The identification information of the lens device is ID information stored in the storage unit included in the lens device or information indicating the identification result of identifying a type of the lens device when the main body part performs the identification processing on the lens device. The information indicating the identification result of identifying a type of the lens device when the main body part performs the identification processing on the lens device can be obtained using a determination by the camera control unit 8 from the information indicating the specifications of the lens device installed in the main body part, information of the lens device input or selected by a user, and the like. For example, the camera control unit 8 acquires the maximum offset information of the center of the image circle or the offset information of the optical axis of the imaging optical system from the storage unit 11 on the basis of the identification information of the lens device and calculates the minimum image circle diameter. The camera control unit 8 calculates the minimum image circle margin which is the length obtained by subtracting the diagonal length of the imaging range of the imaging element from the minimum image circle diameter. The range of the amount of control of the driving of the image blur correction unit 7 is determined using the difference between the minimum image circle margin and the positioning accuracy associated with the imaging element 6.

Not only when the lens device 2a conforming to the system A which is the imaging system in this embodiment is installed in the main body part 1, but also when the lens device 2b conforming to a different system B is installed in the main body part 1, the present invention can be utilized. The information required for the image blur correction is notified from the lens device to the main body part 1 or is stored in the storage unit 11 of the main body part 1. When viewed from the optical axis direction of the imaging optical system, the length obtained by subtracting the diagonal length associated with the imaging range of the imaging element 6 from the length corresponding to the diameter of the image circle with the center of the mount part 5 as a center is calculated. It is possible to determine the range of the amount of drive control of the image blur correction by calculating the difference between the calculated length and the positioning accuracy when the imaging element 6 is positioned at the center of the mount part 5.

According to this embodiment, even with a combination of the lens device conforming to a different system and the main body part of the camera, it is possible to realize the image blur correction with an appropriate amount of drive control without impairing image quality.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-035762, filed Mar. 3, 2020, which is hereby incorporated by reference wherein in its entirety.

What is claimed is:

1. An imaging device in which a lens device is able to be installed via a mount part, comprising:
   at least one processor and memory holding a program which makes the processor function as:
   a correction unit configured to perform image blur correction through driving of an imaging element; and
   a control unit configured to control driving of the correction unit based on detection information of a detection unit configured to detect shaking of the lens device or the imaging device,
   wherein the control unit determines a range of an amount of drive control of the correction unit on the basis of a difference between a second length and a positioning accuracy when the imaging element is positioned at a center of the mount part using the correction unit and wherein the second length is obtained by subtracting a diagonal length associated with an imaging range of the imaging element from a first length corresponding to a closest distance to the center of the mount part from a circumference of an imaging circle when viewed from an optical axis direction of an imaging optical system included in the lens device.

2. The imaging device according to claim 1, wherein a storage unit included in the lens device or the imaging device stores information associated with the diameter of the image circle, and the control unit calculates the second length using information acquired from the storage unit.

3. The imaging device according to claim 2, wherein the storage unit stores image circle diameter information, maximum offset information of a center of the image circle, or offset information of an optical axis of the imaging optical system.

4. The imaging device according to claim 3, wherein the storage unit stores the image circle diameter information and the maximum offset information at the center of the image circle to correspond to a focus state, a zoom state, or an aperture value of the imaging optical system.

5. The imaging device according to claim 3, wherein the storage unit stores the image circle diameter information and the maximum offset information at the center of the image circle as data which does not depend on a focus state, a zoom state, or an aperture value of the imaging optical system.

6. The imaging device according to claim 2, wherein the storage unit included in the imaging device stores information regarding the positioning accuracy as a value unique to the imaging device or a design value.

7. The imaging device according to claim 1, wherein the control unit determines a first range associated with the amount of drive control when a first lens device is installed in the imaging device and determines a second range associated with the amount of drive control which is narrower than the first range when a second lens device is installed in the imaging device.

8. The imaging device according to claim 7, wherein the storage unit included in the first lens device stores the image circle diameter information and the maximum offset information at the center of the image circle, and the storage unit included in the second lens device stores the image circle diameter information.

9. An imaging system including an imaging device in which a lens device is able to be installed via a mount part, comprising:

at least one processor and memory holding a program which makes the processor function as:

a correction unit configured to perform image blur correction through driving of an imaging element; and a control unit configured to control driving of the correction unit based on detection information of a detection unit configured to detect shaking of the lens device or the imaging device, wherein, when a first lens device is installed in the imaging device, the control unit determines a range of the amount of drive control using information acquired from a storage unit of the first lens device, and when a second lens device is installed in the imaging device, the control unit determines the range of the amount of drive control using information acquired from the storage unit of the imaging device.

10. A control method performed using an imaging device in which a lens device is able to be installed via a mount part, comprising:

acquiring, by a control unit, detection information of a detection unit configured to detect shaking of the lens device or the imaging device and determining a range of an amount of drive control of a correction unit included in the imaging device; and performing image blur correction when the correction unit drives an imaging element included in the imaging device in accordance with the amount of drive control, wherein, in the determining, the control unit determines the range of the amount of drive control of the correction unit on the basis of a difference between a second length and positioning accuracy when the imaging element is positioned at a center of the mount part using the correction unit and wherein the second length is obtained by subtracting a diagonal length associated with an imaging range of the imaging element from a first length corresponding to a closest distance to the center of the mount part from a circumference of an imaging circle when viewed from an optical axis direction of an imaging optical system included in the lens device.

* * * * *